(12) United States Patent
Fu et al.

(10) Patent No.: US 8,244,141 B2
(45) Date of Patent: Aug. 14, 2012

(54) METHOD AND APPARATUS FOR GENERATING A DISPERSION COMPENSATION SIGNAL

(75) Inventors: Wei Fu, Shenzhen (CN); Zhihui Tao, Shenzhen (CN); Yue Liu, Shenzhen (CN); Jia Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 12/564,716

(22) Filed: Sep. 22, 2009

(65) Prior Publication Data

US 2010/0014872 A1    Jan. 21, 2010

Related U.S. Application Data

(63) Continuation of application No. PCT/CN2008/070501, filed on Mar. 14, 2008.

(30) Foreign Application Priority Data

Mar. 30, 2007 (CN) .......................... 2007 1 0073930

(51) Int. Cl.
*H04B 10/12* (2006.01)
*H04B 10/00* (2006.01)
*H04B 10/04* (2006.01)

(52) U.S. Cl. .......... 398/193; 398/81; 398/147; 398/148; 398/149; 398/150; 398/198; 398/194; 398/195; 398/196; 398/197

(58) Field of Classification Search .................... 398/81, 398/147–150, 193–198
See application file for complete search history.

(56) References Cited

U.S. PATENT DOCUMENTS

| 6,137,604 A | 10/2000 | Bergano |
| 6,602,002 B1 | 8/2003 | Srivastava et al. |
| 7,382,984 B2 * | 6/2008 | McNicol et al. ............... 398/147 |

(Continued)

FOREIGN PATENT DOCUMENTS

CN          1458759          11/2003

(Continued)

OTHER PUBLICATIONS

Search report issued in corresponding European patent application No. 08715237.7, dated Jun. 24, 2010; total 22 pages.

(Continued)

*Primary Examiner* — Danny Leung
(74) *Attorney, Agent, or Firm* — Conley Rose, P.C.; Grant Rudolph

(57) ABSTRACT

An apparatus for generating a dispersion compensation signal includes a splitting module for splitting a data signal to be transmitted into N channels of data signals; N pre-processing modules for adjusting in frequency domain the phases and amplitudes of the N channels of data signals and outputting N channels of pre-warped electrical signals; an optical carrier generating module for generating N channels of coherent optical carriers; N electro-optic modulators for modulating the N channels of coherent optical carriers based on the N channels of pre-warped electrical signals and generating N channels of pre-warped optical signals; an optical coupling module for coupling the N channels of pre-warped optical signals into a dispersion compensation optical signal. By pre-processing the data signals, the present disclosure may allow the use of existing devices to generate a dispersion compensation signal so that the bandwidth requirement set by prior art on the electrical device is reduced.

10 Claims, 4 Drawing Sheets

U.S. PATENT DOCUMENTS

| | | | |
|---|---|---|---|
| 2003/0016415 A1 * | 1/2003 | Jun et al. | 359/133 |
| 2004/0161247 A1 | 8/2004 | Murai | |
| 2005/0047791 A1 | 3/2005 | Miyazaki | |
| 2006/0024062 A1 | 2/2006 | Jakober et al. | |
| 2006/0078336 A1 | 4/2006 | McNicol et al. | |
| 2008/0273874 A1 * | 11/2008 | Ramachandran et al. | 398/43 |

FOREIGN PATENT DOCUMENTS

| | | |
|---|---|---|
| CN | 1472892 | 2/2004 |
| CN | 1652006 | 8/2005 |
| EP | 0657754 A1 | 6/1995 |
| WO | 2004032386 A1 | 4/2004 |

OTHER PUBLICATIONS

Written opinion issued in corresponding PCT application No. PCT/CN2008/070501, dated Jun. 26, 2008; total 3 pages.

Foreign communication from a counter-part application, Chinese application 200710073930.X, Office Action mailed Mar. 2, 2012, 5 pages.

Foreign communication from a counter-part application, Chinese application 200710073930.X, Partial English Translation Office Action mailed Mar. 2, 2012, 6 pages.

* cited by examiner ically first, and generates Carrier-Suppressed Return-to-Zero electrical signals with various pulse widths. Then, a pre-compensation module is used to perform dispersion pre-compensation on the Carrier-Suppressed Return-to-Zero electrical signals to generate digital pre-warped electrical signals. The digital pre-warped electrical signals are converted to dispersion pre-compensation CSRZ electrical signals via a digit-analog converting module. Finally, the dispersion pre-compensation# METHOD AND APPARATUS FOR GENERATING A DISPERSION COMPENSATION SIGNAL

CROSS REFERENCE

This application is a continuation of International Application No. PCT/CN2008/070501, filed on Mar. 14, 2008, which claims the priority of CN application No. 200710073930.X, filed Mar. 30, 2007 with the State Intellectual Property Office of the People's Republic of China, entitled "METHOD AND APPARATUS FOR GENERATING A DISPERSION COMPENSATION SIGNAL", both of which are incorporated herein by reference in their entireties.

FIELD OF THE INVENTION

The present disclosure relates to communication transmission field, more specifically to a method and an apparatus for generating a dispersion compensation signal.

BACKGROUND

In optical fiber transmission system, dispersion effect, as a result of different frequency components or various transmission rates for various modes of frequency components, may severely affect signals traveling in the optical fibers and thus distort signal waves and cause inter-symbol interference. The damage incurred by the dispersion on the system performance cannot be ignored. Generally, an optical fiber transmission system over 10 Gbit/s requires a dispersion compensation to guarantee the transmission function of the system. Currently, a widely-commercialized dispersion compensation technique utilizes dispersion compensation optical fibers which are contrary to the dispersion characteristics of the transmission optical fiber to realize dispersion compensation. In recent years, due to the long distance dispersion compensation capability and self-adapted compensation capability, an electrical dispersion compensation technique at a transmitting end overcomes the defect of using dispersion compensation optical fibers and thus draws wide attention of the industry. However, one problem of the dispersion pre-compensation is that it may introduce a considerable peak power to average power ratio at the transmitting end, which may cause the signal to suffer from a severer non-linear effect during transmission. The non-linear effect herein mainly refers to self-phase modulation effect, cross-phase modulation effect, four-wave mixing effect and the like in optical fibers. The influence of the non-linear effect is associated with signal transmission distance, launching power and signal waveform. The non-linear effect on the optical fiber transmission system over 10 Gbit/s cannot be ignored. Currently, an effective way to suppress non-linear effect is to employ a new modulation mode, for example, Return-to-Zero (RZ), Carrier-Suppressed Return-to-Zero (CSRZ), Chirped Return-to-Zero (CRZ).

A block diagram of a transmitter capable of electrical dispersion pre-compensation in the prior art is illustrated in FIG. 1. The transmitter encodes the data signal electrically first, and generates Carrier-Suppressed Return-to-Zero electrical signals with various pulse widths. Then, a pre-compensation module is used to perform dispersion pre-compensation on the Carrier-Suppressed Return-to-Zero electrical signals to generate digital pre-warped electrical signals. The digital pre-warped electrical signals are converted to dispersion pre-compensation CSRZ electrical signals via a digit-analog converting module. Finally, the dispersion pre-compensation CSRZ electrical signals are processed by an electro-optic modulator and output as pre-warped optical signals. The pre-warped optical signals are used to compensate the dispersion effect caused by the optical fiber lines coupled to the electro-optic modulator. However, the CSRZ electrical signal introduced by the coding module may broaden the bandwidth of the data signal. For a system over 10 Gbit/s, the bandwidth of the current digit-analog conversion module cannot fulfill the bandwidth requirement.

FIG. 2 illustrates a conventional chart of the spectrum of a dispersion pre-compensation CSRZ electrical signal, where the x-axis and y-axis indicates frequency and power of the CSRZ electrical signal $$s(t)\sin\frac{\omega_b}{2}t,$$

respectively. The CSRZ electrical signal has a duty cycle of 67%, with a main lobe width of 15 GHz, which is 50% broader than the main lobe width of the conventional Non Return-to-Zero symbols. As a result, the digit-analog converter is required to have a bandwidth of at least 30 GHz. Therefore, the bandwidth of the electrical device such as digit-analog converter required by the electrical dispersion compensation technique has to be increased accordingly. However, the existing digit-analog converter cannot meet the requirement. Therefore, introducing the Return-to-Zero symbols to electrical dispersion pre-compensation technique for suppressing non-linear effect cannot be realized in the prior art.

SUMMARY

An apparatus and a method for generating a dispersion compensation signal are provided according to embodiments of the present disclosure. Accordingly, the present disclosure may eliminate the need for an overly broad bandwidth for electrical devices as required by the conventional electrical dispersion compensation technique where Return-to-Zero symbols are introduced. In this way, the signal transmission quality is improved.

The apparatus for generating a dispersion compensation signal according to an embodiment of the present disclosure includes a splitting module, N pre-processing modules, N electro-optic modulators, an optical carrier generating module, and an optical coupling module.

The splitting module is configured to split a data signal to be sent into N channels of data signals.

The N pre-processing modules are configured to adjust in frequency domain the phases and amplitudes of the N channels of data signals output from the splitting module and output N channels of pre-warped electrical signals.

The optical carrier generating module is configured to generate N channels of coherent optical carriers.

The N electro-optic modulators are configured to modulate the N channels of coherent optical carriers based on the N channels of pre-warped electrical signals and generate N channels of pre-warped optical signals.

The optical coupling module is configured to couple the N channels of pre-warped optical signals into a dispersion compensation optical signal, where N is a natural number greater than 1.

A method for generating a dispersion compensation signal is also provided according to an embodiment of the present disclosure. The method includes:

splitting a data signal to be transmitted into N channels of data signals;

adjusting in frequency domain the phases and amplitudes of the N channels of data signals and outputting N channels of pre-warped electrical signals;

modulating the N channels of coherent optical carriers based on the N channels of pre-warped electrical signals, and generating N channels of pre-warped optical signals; and coupling the N channels of pre-warped optical signals into a dispersion compensation optical signal;

where N is a natural number greater than 1.

Accordingly, the embodiments of the present disclosure may allow using the existing devices to generate the dispersion compensation signal by pre-processing N channels (two or more channels) of data signals. Therefore, the bandwidth requirement for electronic devices is lowered. Accordingly, the defect that the prior art is not able to introduce the Return-to-Zero symbols to electrical dispersion pre-compensation technique for suppressing non-linear effect can be overcome.

DETAILED DESCRIPTION

Technical solutions according to the present disclosure are described below in conjunction with various embodiments.

Embodiment 1

Figure 1:
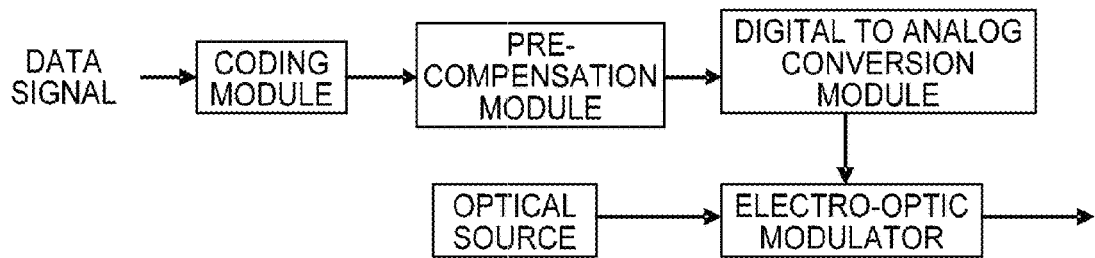
FIG. 1 is a conventional block diagram of a transmitter capable of electrical dispersion pre-compensation.
Figure 2:
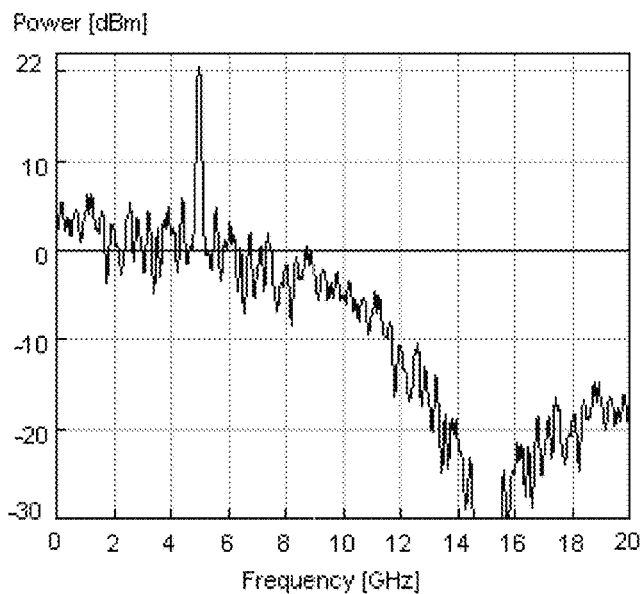
FIG. 2 is a conventional chart of a spectrum of a dispersion pre-compensation CSRZ signal.
Figure 3:
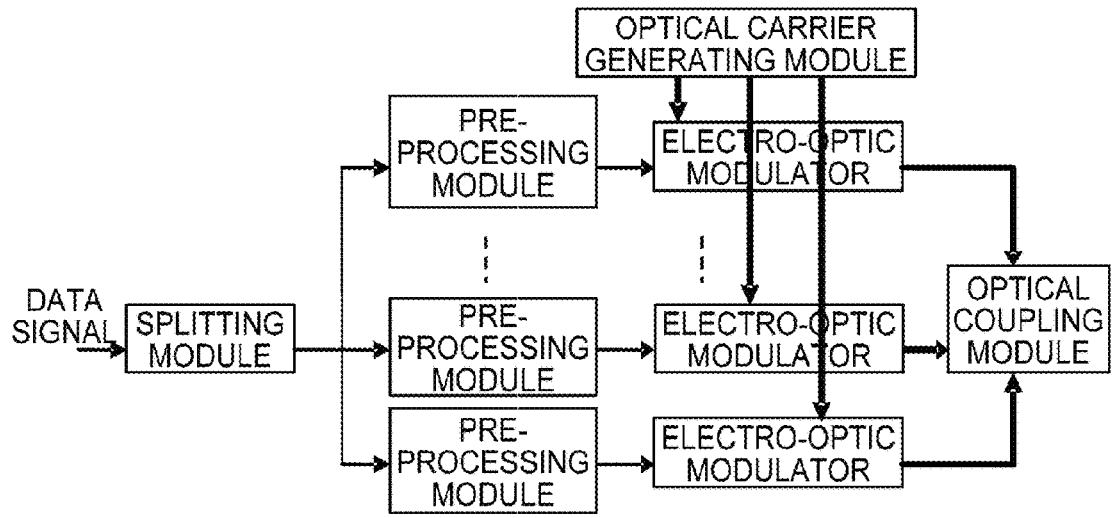
FIG. 3 is a block diagram of an apparatus for generating a disperse compensation signal according to a first embodiment of the present disclosure.

FIG. 3 illustrates a block diagram of an apparatus for generating a disperse compensation signal according to an embodiment of the present disclosure. The thin solid lines stand for electrical signals while the bold solid lines stand for optical signals. The apparatus for generating the disperse compensation signal includes five components, namely a splitting module, N pre-processing modules, N electro-optic modulators, an optical carrier generating module, and an optical coupling module. The splitting module is configured to split a data signal to be sent into N channels of data signals. The N pre-processing modules are configured to adjust in frequency domain the phases and amplitudes of the N channels of data signals output from the splitting module. The adjusting method is described as follows. The function expression of the RZ optical signal is decomposed into N terms based on the transformation relationship between imaginary index expression and trigonometric function expression. Each term corresponds to a frequency offset. N pre-processing functions are generated based on the dispersion compensation functions corresponding to N frequency offsets respectively. The N pre-processing functions perform convolution operation on the N channels of data signals, respectively, so as to adjust in frequency domain the phases and amplitudes of the N channels of data signals and output N channels of pre-warped electrical signals. Usually, the processing function for each pre-processing module may be defined by a dispersion compensation function which is used to lessen the dispersion impact and by a function expressing the dispersion pre-compensation signal to be generated. The optical carrier generating module is configured to generate N channels of coherent optical carriers. The N electro-optic modulators are configured to modulate the N channels of coherent optical carriers based on the N channels of pre-warped electrical signals generated by the N pre-processing modules and generate N channels of pre-warped optical signals. The optical coupling module is configured to couple the N channels of pre-warped optical signals into a dispersion compensation optical signal.

Embodiment 2

Figure 4:
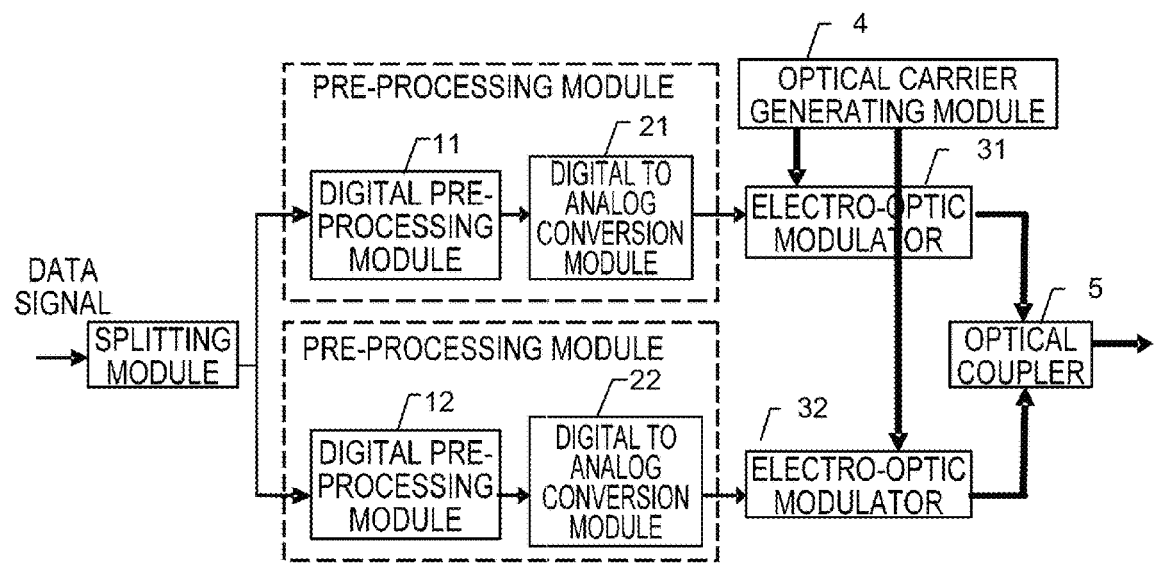
FIG. 4 is a block diagram of an apparatus for generating a disperse compensation signal according to a second embodiment of the present disclosure.

FIG. 4 illustrates an apparatus for generating a dispersion compensation signal according to an embodiment of the present disclosure. The pre-processing module includes a digital pre-processing module and a digit-analog conversion module. The optical coupling module may be an optical coupler. The digital pre-processing module is configured to adjust phases and amplitudes of the data signals in digital frequency domain and output digital pre-warped electrical signals. The digit-analog conversion module is configured to convert the digital pre-warped electrical signals into analog pre-warped electrical signals.

An example is given below in which CSRZ signal is used for dispersion pre-compensation.

The splitting module splits the data signal to be transmitted into two channels. The two channel data signals go through a digital pre-processing module 11 and a digital pre-processing module 12, respectively. The processing functions of the two digital preprocessing modules can be generated as follows. The CSRZ signal $$s(t)\sin\frac{\omega_b}{2}t$$

($\omega_b$ is the data signal rate) can be split into two terms based on the transformation relationship between imaginary index expression and trigonometric function expression. These two terms are as follows:

$$s(t)\exp\left(j\frac{\omega_b}{2}t\right) \text{ and } s(t)\exp\left(-j\frac{\omega_b}{2}t\right)$$

The dispersion compensation function h(t) undergoes two frequency shifts and generates two processing functions of two digital pre-processing modules:

$$h(t)\exp\left(j\frac{\omega_b}{2}t\right) \text{ and } h(t)\exp\left(-j\frac{\omega_b}{2}t\right).$$

Two channel data signals s(t) are processed by the two processing functions and output as digital pre-warped electrical signals. Generally, the processing function is determined by dispersion compensation function capable of attenuating dispersion effect and the form of CSRZ signal. The digital pre-processing module may be a finite impulse response filter, an infinite impulse response filter, a fast Fourier transform filter, or a lookup table processing unit. The digital pre-processing module may adjust the dispersion compensation function based on the dispersion parameters of the optical fiber transmission system so as to realize dynamic dispersion compensation adjustment.

Figure 5A:
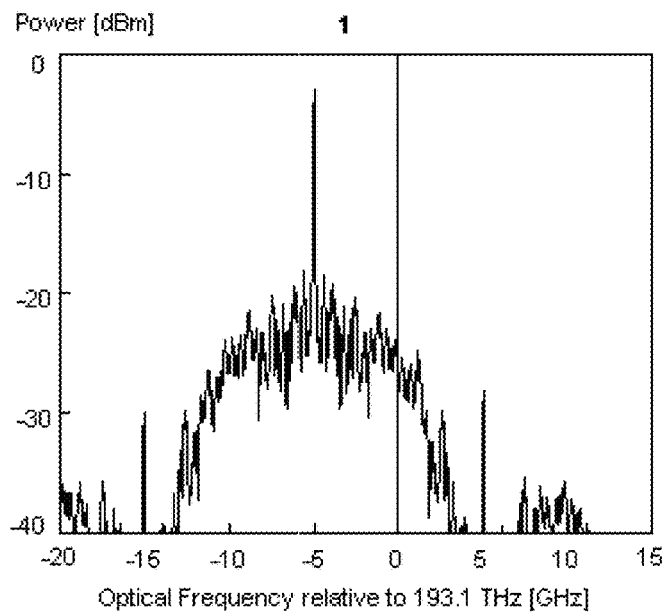
FIG. 5 illustrates an optical spectrum according to a second embodiment of the present disclosure.
Figure 5B:
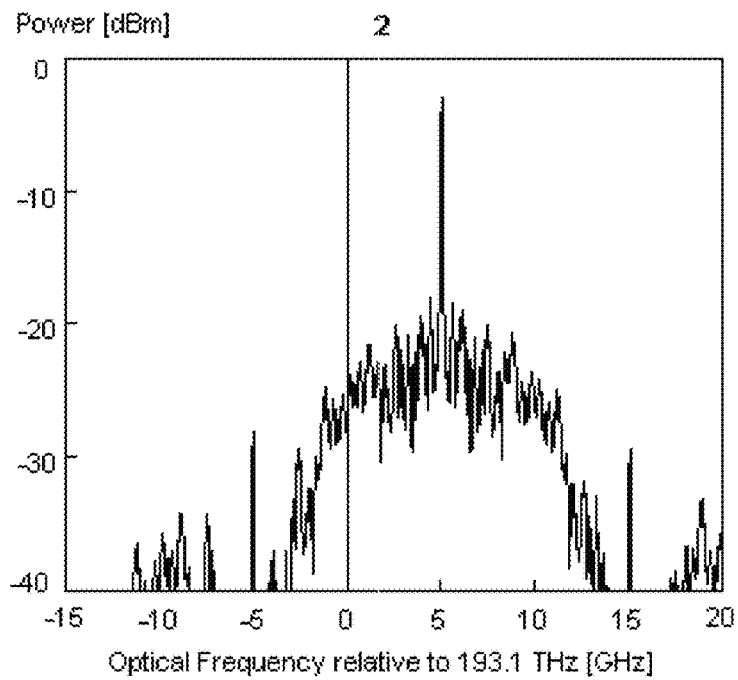
Figure 5C:
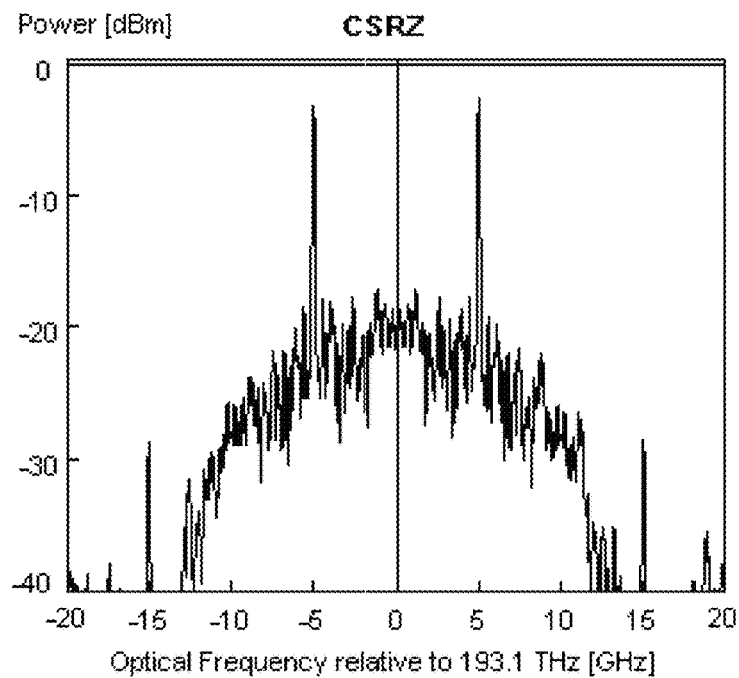

The digital pre-warped electrical signals output from the digital pre-processing modules 11 and 12 are converted into two channels of pre-warped electrical signals respectively via digit-analog converters 21 and 22. The two channels of pre-warped electrical signals drive respective electro-optic modulators 31 and 32 which modulate two channels of optical carriers generated by the optical carrier generating module 4 so as to generate two channels of pre-warped optical signals. The optical spectrums output from the electro-optic modulator 31 and 32 are as shown in FIGS. 5(a) and 5(b). Finally, a dispersion compensation optical signal capable of dispersion compensation is then obtained by a coupler 5 which adds up the pre-warped optical signals. The output spectrum from the coupler 5 is as illustrated in FIG. 5(c).

Embodiment 3

Figure 6:
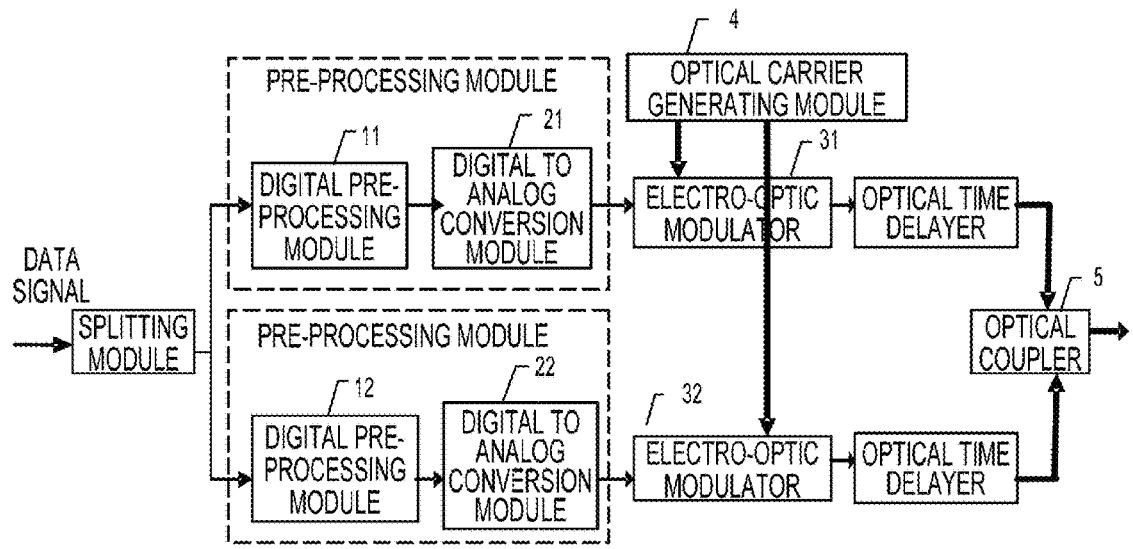
FIG. 6 is a block diagram of an apparatus for generating a disperse compensation signal according to a third embodiment of the present disclosure.

FIG. 6 illustrates an apparatus for generating a dispersion compensation signal according to an embodiment of the present disclosure. Based on the second embodiment, the present embodiment additionally provides two optical delayers. Two channels of pre-warped optical signals output from two electro-optic modulators are fed into two optical delayers. The optical delayers delay the pre-warped optical signals and adjust the time difference between the two channels of pre-warped optical signals so that two channels of pre-warped optical signals may enter the optical coupler simultaneously and thus achieve synchronization.

As understood by those skilled in the art, the optical coupling module according to the present disclosure may further include N delayers and an optical coupler.

Figure 7:
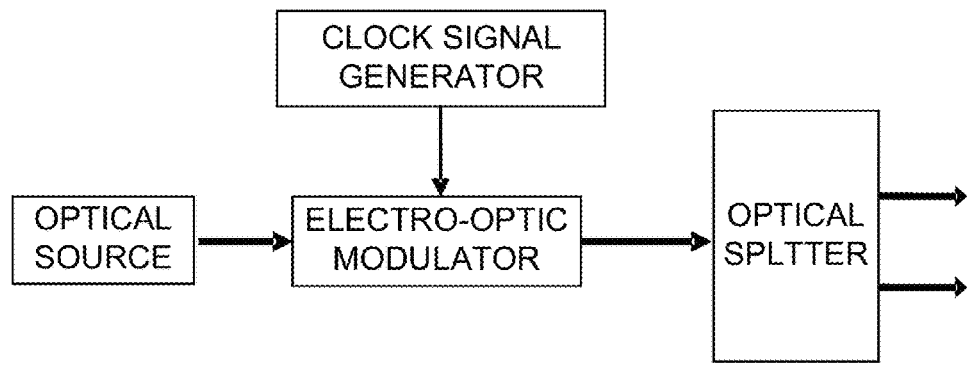
FIG. 7 is a block diagram of an optical carrier generating module according to an embodiment of the present disclosure.

FIG. 7 is a block diagram of the optical carrier generating module according to an embodiment of the present disclosure. The optical carrier generating module implements generation of a plurality of optical carriers among which a certain phase relationship, e.g., in-phase or inverse phase, is met. The optical carrier generating module includes an optical source for generating a single optical carrier, a clock signal generator, an electro-optic modulator and an optical splitter.

The clock signal generator is configured to generate a clock signal having a frequency which is an integer multiple of half the data signal rate. Taking CSRZ signal capable of dispersion pre-compensation for an example, the CSRZ signal is split into two terms including frequency offsets which are positive $$\frac{\omega_b}{2}$$

and negative $$\frac{\omega_b}{2}.$$

Hence, the clock signal generator may need to generate a clock signal with a frequency of $$\frac{\omega_b}{2}.$$

After splitting other RZ optical signal, these signals include N terms of frequency offsets which are integers multiple of $$\frac{\omega_b}{2}.$$

Therefore, the clock signal generator needs to generate a clock signal having a frequency value which is an integer multiple of half the data signal rate. The single optical carrier is fed into the electro-optic modulator. The electro-optic modulator modulates the single optical carrier with the clock signal so that the spectrum of the single optical carrier moves from center to left and right. Subsequently, two channels of coherent optical carriers are output and transmitted in combination where these two coherent optical carriers are symmetric along the center of the spectrum. For instance, if the central frequency of the optical signal output from the optical source is 193.1 THz, the transmission rate of the data signal is 10 Gb/s and the frequency of the clock signal at that time is 5 GHz, then, the two channels of coherent optical carriers, which are output from the electro-optic modulator and are transmitted in combination, are 193.1 THz+5 GHz and 193.1 THz−5 GHz. The optical splitter is configured to split the coherent optical carriers transmitted in combination into individual optical carriers which are transmitted separately. Specifically, after two channels of coherent optical carriers transmitted in combination have been processed by the optical splitter, two channels of optical carriers at 193.1 THz+5 GHz and 193.1 THz−5 GHz are generated and transmitted independently.

If three channels of optical carriers are required, an additional optical source may be provided so as to generate different optical signals. Then, the output optical carriers may be at 193.1 THz+5 GHz, 193.1 THz, 193.1 THz−5 GHz. If four channels of optical carriers are required, two sets of devices which include two clock signal generators, two electro-optic modulators, two optical splitters, are provided, as shown in FIG. 7. Accordingly, if N channels of optical carriers are required, it is only necessary to multiply and combine the devices in FIG. 7.

In an embodiment, the electro-optic modulator may be a Mach-Zehnder modulator, or may be an Electro-Absorption modulator.

A method for generating a dispersion compensation signal is also provided according to an embodiment of the present disclosure. The method includes:
splitting a data signal to be transmitted into N channels of data signals; and
adjusting the phases and amplitudes of N channels of data signals in frequency domain and outputting N channels of pre-warped electrical signals. Specifically, the phases and amplitudes of N channels of data signals are adjusted in digital frequency and output as N channels of digital pre-warped electrical signals. These N channels of digital pre-warped electrical signal are then converted into N channels of analog pre-warped electrical signals.

The process of generating N channels of coherent optical carriers includes generating a clock signal having a frequency value which is an integer multiple of half of the data signal rate; modulating the signal optical carriers with the clock signal and outputting N channels of coherent optical carriers transmitted in combination; splitting the N channels of coherent optical carriers transmitted in combination into N channels of coherent optical carriers transmitted separately.

The method further includes modulating N channels of coherent optical carriers based on the N channels of pre-warped electrical signals; generating N channels of pre-warped optical signals; adjusting the time difference among N channels of pre-warped optical signals so that the adjusted N channels of pre-warped optical signal may enter the optical coupler at the same time; coupling the adjusted N channels of pre-warped optical signals into one dispersion compensation optical signal, where N is a natural number greater than 1.

The dispersion compensation signal according to the present disclosure may be utilized to perform dispersion compensation on the optical signals traveling through the optical fiber transmission system and to recover data signal well at the receiving end of the optical fiber transmission system. Since the need for the dispersion compensation fiber is eliminated and the data signals are pre-processed electrically, dynamic adjustment of dispersion compensation may be realized. After Return-to-Zero symbols are introduced, the dispersion compensation signal's ability to counter the non-linear effect of the optical fiber is enhanced. By pre-processing two or more channels of data signals, one can use the existing devices to generate the dispersion compensation signal, thereby lowering the bandwidth requirement for electrical devices. Accordingly, the defect that the prior art is not able to introduce the Return-to-Zero symbols to electrical dispersion pre-compensation technique for suppressing non-linear effect can be overcome.

The foregoing is merely exemplary embodiments of the present disclosure, while the scope of the present disclosure is not limited to such embodiments. Any variations or equivalents can be readily appreciated by those skilled in the art. These variations or equivalents shall be construed as fall within the scope of the present disclosure. Therefore, the scope of the present disclosure should be determined by the scope of the claims.

What is claimed is:

1. An apparatus for generating a dispersion compensation signal, comprising: a splitting module; N pre-processing modules; N electro-optic modulators; an optical carrier generating module; N optical delayers; and an optical coupling module,
   wherein the splitting module is configured to split a data signal to be sent into N channels of data signals,
   wherein the N pre-processing modules are configured to adjust in frequency domain phases and amplitudes of the N channels of data signals output from the splitting module and output N channels of analog electrical signals,
   wherein the optical carrier generating module is configured to generate N channels of coherent optical carriers,
   wherein the N electro-optic modulators are configured to modulate the N channels of coherent optical carriers based on the N channels of analog electrical signals and generate N channels of optical signals,
   wherein the N optical delayers are configured to delay the N channels of optical signals generated by the N electro-optic modulators and adjust time difference among the N channels of optical signals so that the adjusted N channels of optical signals may enter the optical coupling module simultaneously,
   wherein the optical coupling module is configured to couple the adjusted N channels of optical signals into the dispersion compensation signal,
   wherein N is a natural number greater than 1,
   wherein the pre-processing module comprises a digital pre-processing module and a digit-analog conversion module,
   wherein the digital pre-processing module is configured to adjust in digital frequency domain phases and amplitudes of the N channels of data signals and output N channels of digital electrical signals, and
   wherein the digit-analog conversion module is configured to convert the N channels of digital electrical signals into N channels of analog electrical signals.

2. The apparatus of claim 1, wherein the electro-optic modulator is a Mach-Zehnder modulator.

3. The apparatus of claim 1, wherein the electro-optic modulator is an Electro-Absorption modulator.

4. An apparatus for generating a dispersion compensation signal, comprising: a splitting module; N pre-processing modules; N electro-optic modulators; an optical carrier generating module; N optical delayers; and an optical coupling module,
   wherein the splitting module is configured to split a data signal to be sent into N channels of data signals,
   wherein the N pre-processing modules are configured to adjust in frequency domain phases and amplitudes of the N channels of data signals output from the splitting module and output N channels of analog electrical signals,
   wherein the optical carrier generating module is configured to generate N channels of coherent optical carriers,
   wherein the N electro-optic modulators are configured to modulate the N channels of coherent optical carriers based on the N channels of analog electrical signals and generate N channels of optical signals,
   wherein the optical coupling module is configured to couple the adjusted N channels of optical signals into the dispersion compensation signal,
   wherein N is a natural number greater than 1,
   wherein the pre-processing module comprises a digital pre-processing module and a digit-analog conversion module,
   wherein the digital pre-processing module is configured to adjust in digital frequency domain phases and amplitudes of the N channels of data signals and output N channels of digital electrical signals, and
   wherein the digit-analog conversion module is configured to convert the N channels of digital electrical signals into N channels of analog electrical signals,
   wherein the optical carrier generating module comprises at least one optical source for generating optical carriers, at least one clock signal generator and at least one electro-optic modulator and an optical splitter,
   wherein the clock signal generator is configured to generate a clock signal having a frequency which is an integer multiple of half the data signal rate,
   wherein the electro-optic modulator is configured to modulate the optical carriers with the clock signal and obtain N channels of coherent optical carriers and combine the N channels of coherent optical carriers to output to the optical splitter, and
   wherein the optical splitter is configured to split the N channels of coherent optical carriers transmitted in combination into N channels of optical carriers which are transmitted separately.

5. The apparatus of claim 4, wherein the electro-optic modulator is a Mach-Zehnder modulator.

6. The apparatus of claim 4, wherein the electro-optic modulator is an Electro-Absorption modulator.

7. A method for generating a dispersion compensation signal, comprising:
   splitting a data signal to be transmitted into N channels of data signals;

adjusting in frequency domain the phases and amplitudes of the N channels of data signals and outputting N channels of electrical signals;

modulating the N channels of coherent optical carriers based on the N channels of electrical signals and generating N channels of optical signals; and coupling the N channels of optical signals into a dispersion compensation optical signal, wherein N is a natural number greater than 1, wherein coupling the N channels of optical signals into the dispersion compensation signal comprises:

adjusting the time difference among the N channels of optical signals so that the adjusted N channels of optical signals enter an optical coupler simultaneously; and coupling the N channels of adjusted optical signals into the dispersion compensation signal.

8. The method of claim 7, wherein adjusting in frequency domain the phases and amplitudes of the N channels of data signals and outputting N channels of electrical signals comprises:

adjusting in digital frequency domain the phases and amplitudes of the N channels of data signals and outputting N channels of digital electrical signals; and converting the N channels of digital electrical signals into N channels of analog electrical signals.

9. A method for generating a dispersion compensation signal, comprising:

splitting a data signal to be transmitted into N channels of data signals;

adjusting in frequency domain the phases and amplitudes of the N channels of data signals and outputting N channels of electrical signals;

modulating the N channels of coherent optical carriers based on the N channels of electrical signals and generating N channels of optical signals; and coupling the N channels of optical signals into a dispersion compensation optical signal, wherein N is a natural number greater than 1, wherein the generating N channels of coherent optical carriers comprises:

generating a clock signal having a frequency which is an integer multiple of half the data signal rate;

modulating the optical carriers with the clock signal to obtain N channels of coherent optical carriers and transmitting in combination the N channels of coherent optical carriers; and splitting the N channels of coherent optical carriers which are transmitted in combination into N channels of coherent optical carriers which are transmitted separately.

10. The method of claim 9, wherein adjusting in frequency domain the phases and amplitudes of the N channels of data signals and outputting N channels of electrical signals comprises:

adjusting in digital frequency domain the phases and amplitudes of the N channels of data signals and outputting N channels of digital electrical signals; and converting the N channels of digital electrical signals into N channels of analog electrical signals.

* * * * *

UNITED STATES PATENT AND TRADEMARK OFFICE
CERTIFICATE OF CORRECTION

| | | |
|---|---|---|
| PATENT NO. | : 8,244,141 B2 | Page 1 of 1 |
| APPLICATION NO. | : 12/564716 | |
| DATED | : August 14, 2012 | |
| INVENTOR(S) | : Wei Fu et al. | |

It is certified that error appears in the above-identified patent and that said Letters Patent is hereby corrected as shown below:

Front of patent: (74) Attorney, Agent or Firm - should read "Conley Rose, P.C., Grant Rodolph"

Signed and Sealed this
Second Day of October, 2012

David J. Kappos
*Director of the United States Patent and Trademark Office*